*(12)* United States Patent
Spatafora

(10) Patent No.: US 6,779,533 B2
(45) Date of Patent: Aug. 24, 2004

(54) METHOD AND MACHINE FOR ON-LINE TREATING AND/OR PROCESSING CONTAINERS

(75) Inventor: Mario Spatafora, Bologna (IT)

(73) Assignee: G.D Societa Per Azioni, Bologna (IT)

( * ) Notice: Subject to any disclaimer, the term of this patent is extended or adjusted under 35 U.S.C. 154(b) by 0 days.

(21) Appl. No.: 10/288,259

(22) Filed: Nov. 5, 2002

(65) Prior Publication Data

US 2003/0116222 A1 Jun. 26, 2003

Related U.S. Application Data

(63) Continuation of application No. PCT/IT01/00216, filed on May 7, 2001.

(30) Foreign Application Priority Data

May 8, 2000 (IT) .................................... BO2000A0259

(51) Int. Cl.⁷ ................................................ B08B 9/08
(52) U.S. Cl. ..................... 134/22.1; 134/22.18; 134/23; 134/62; 134/80; 134/158
(58) Field of Search ............................ 134/22.1, 22.18, 134/23, 25.2, 62, 80, 134, 153, 158, 169 R

(56) References Cited

U.S. PATENT DOCUMENTS 2,184,100 A  * 12/1939  Mondloch .................... 134/62
3,311,500 A  *  3/1967  Seto ............................. 134/23
3,958,685 A      5/1976  McDonald et al. ......... 198/179
4,174,722 A  * 11/1979  Fleenor et al. ................ 134/62
4,295,503 A  * 10/1981  Gilmour ....................... 141/90
5,598,859 A  *  2/1997  Kronseder .................... 134/62
6,415,802 B1 *  7/2002  Clixby et al. ................. 134/80

FOREIGN PATENT DOCUMENTS

EP         0596487 A1     5/1994

* cited by examiner

*Primary Examiner*—Frankie L. Stinson
*Assistant Examiner*—Saeed Chaudhry
(74) *Attorney, Agent, or Firm*—Ladas & Parry

(57) ABSTRACT

A method and machine for on-line treating and/or processing containers (2), whereby a container (2) is fed along a production line (45), a portion of which is defined by an endless conveyor (3) extending through a loading station (43; 55) and an unloading station (41; 55) for containers (2); the container (2), as it is fed along by the conveyor (3), being subjected to a treatment and/or processing operation inside a respective cell (17), which is movable with the conveyor (3) to receive the container (2) at the loading station (43; 55) and to release the container (2) at the unloading station (41; 55).

15 Claims, 5 Drawing Sheets

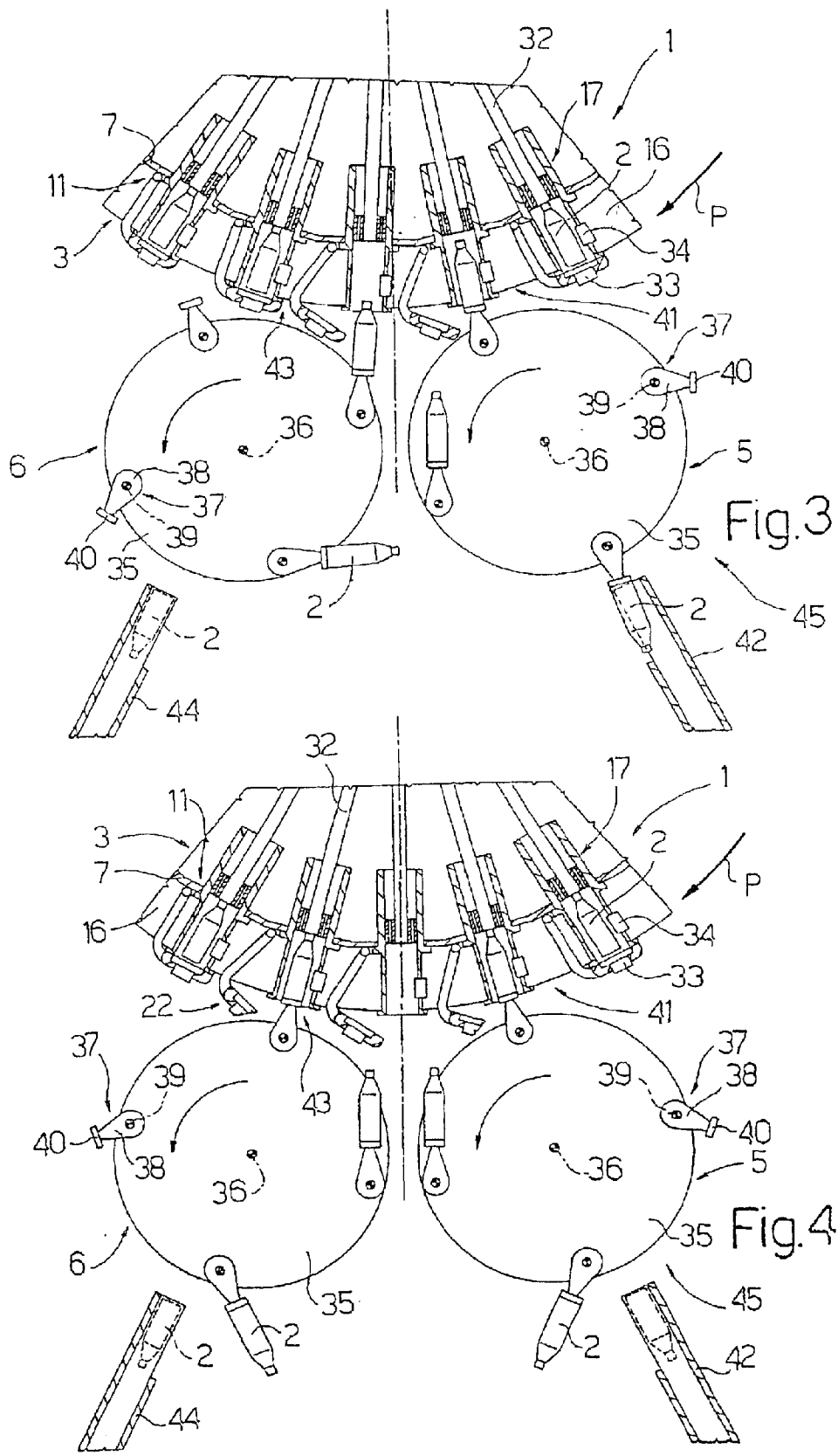

METHOD AND MACHINE FOR ON-LINE TREATING AND/OR PROCESSING CONTAINERS

This application is a continuation of copending International Application PCT/IT01/00216 filed on May 7, 2001, which designated the U.S., claims the benefit thereof and incorporates the same by reference.

TECHNICAL FIELD

The present invention relates to a method of on-line treating and/or processing containers.

The present invention may be used to advantage for producing and filling bottles for liquid food products, to which the following description refers purely by way of example.

BACKGROUND ART

In the manufacture of glass or plastic bottles for food products, the bottles are treated and/or processed in various ways before being fed to a filling station. Since each process takes a certain length of time, the bottles are step-fed along a given processing path and arrested between steps at successive processing stations. Such a method obviously results in relatively slow throughput of the bottles, and in relatively low output of the production line as a whole.

Alternatively, the bottles are fed, on a continuous production line, along a given path extending through one or more processing stations, are unloaded off the production line at each processing station, and are loaded back on to the production line after processing.

This method also involves drawbacks by requiring the use of bottle loading and unloading devices which are invariably expensive, bulky, and unreliable.

EP-0596487-A1 discloses a machine for selectively crystallizes molecularly oriented thermoplastic bottles, each of which is composed of portions thereof with different degrees of orientation. Portions of each bottle are heat treated at temperatures suitable to crystallize said portions according to the degrees of orientation thereof wherein the heat treatment takes place in a heating environment on an unconfined container. The selectively crystallized container is then sized in a finishing means, each of which consists of two halves movable into closed and open positions by means of hinge; the two halves form, when closed, a space corresponding to the desired final shape of those regions of the container which were heat-treated, and which will have shrunk and deformed due to that treatment. The freshly treated bottles are quickly encased within that space while still at a deformation temperature and pressurized to conform them to the sizing fixture, which is cooled by conventional means; they are kept there until cold enough to maintain the dimensions determined by the fixture, at which time the specified contained volume of the bottle is fixed. The bottles emerging from a heat tunnel are transferred by means of conventional grippers into the sizing fixtures mounted on turntable, which is rotated at a speed corresponding to the rate of emergence of containers from tunnel.

DISCLOSURE OF INVENTION

It is an object of the present invention to provide a method of treating and/or processing containers, which is cheap and easy to implement, while at the same time being relatively fast.

According to the present invention, there is provided a method of on-line treating and/or processing containers, as recited in Claim 1.

An important aspect of the method defined above is that the container is loaded radially into a respective processing cell positioned radially, i.e. substantially horizontally. The radial position of the processing cell, in fact, not only makes for an extremely compact conveying drum, but also enables the cell to support the respective container naturally with no need for any accessory fixtures, and enables the container, if necessary, to be manipulated extremely easily inside the respective cell, regardless of its weight, which is supported directly by the respective horizontally positioned cell.

The present invention also relates to a machine for treating and/or processing containers.

According to the present invention, there is provided a machine for on-line treating and/or processing containers, as recited in Claim 3 and in Claim 16.

In a preferred embodiment of the machine defined above, said conveying drum has at least one ring of said radial cells equally spaced about said axis of rotation of the conveying drum, and preferably a number of rings of cells superimposed along said axis.

When a number of superimposed rings of cells are employed, said transfer means preferably extend along the axis of rotation of said conveying drum to simultaneously load and, respectively, simultaneously unload a number of said containers into and from respective said cells, each located along a respective said ring.

BRIEF DESCRIPTION OF THE DRAWINGS

A number of non-limiting embodiments of the present invention will be described by way of example with reference to the accompanying drawings, in which:

FIGS. 3 and 4 show plan views, with parts removed for clarity, of the FIG. 1 machine in two different operating positions;

BEST MODE FOR CARRYING OUT THE INVENTION

Figure 1:
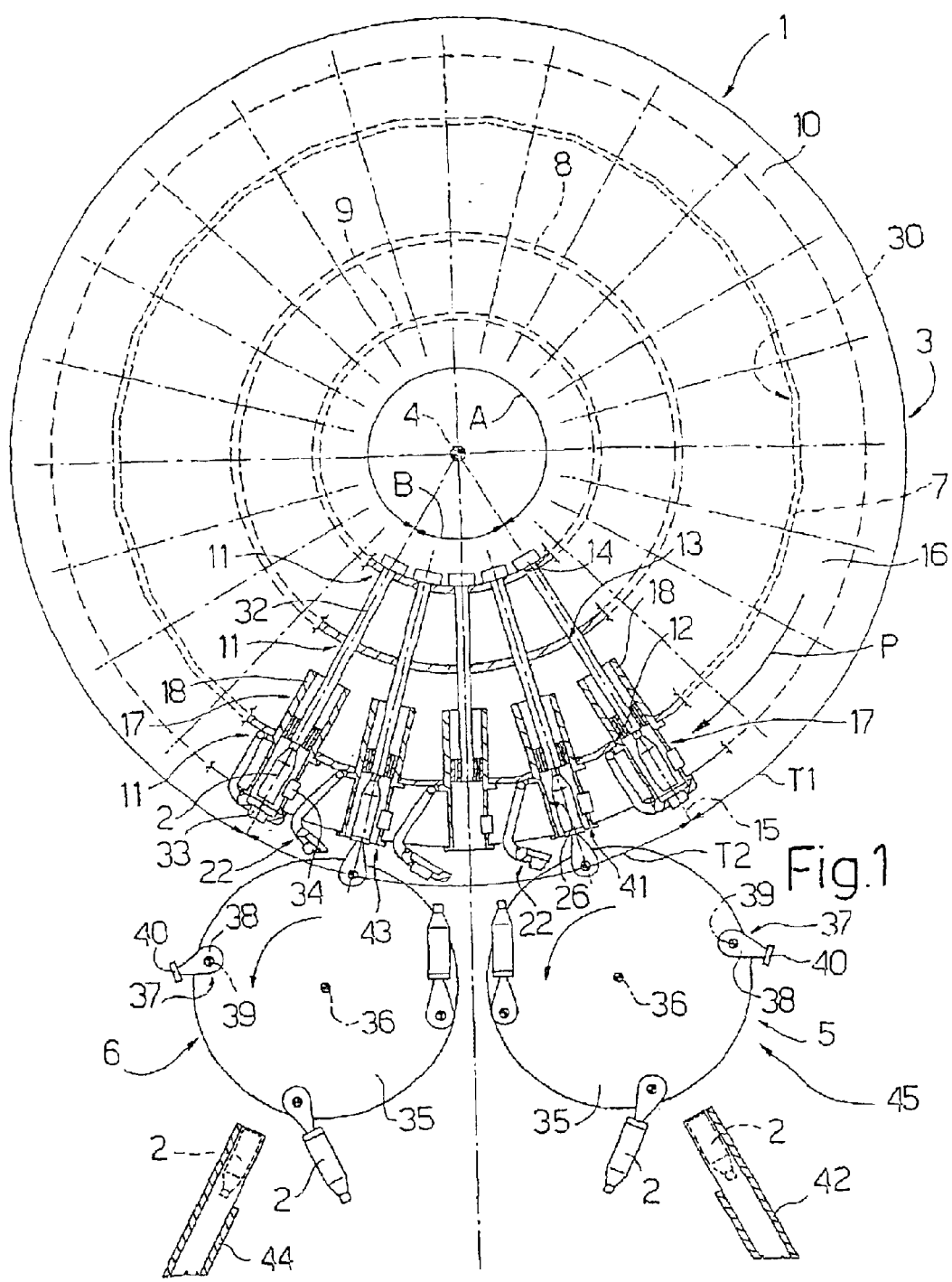
FIG. 1 shows a partly sectioned plan view, with parts removed for clarity, of a preferred embodiment of the machine according to the present invention.

Number 1 in FIG. 1 indicates as a whole a machine for on-line treating and/or processing bottles 2, in particular, bottles for liquid food products.

Machine 1 comprises a conveyor defined by a drum 3 rotating, clockwise in FIG. 1, about a vertical axis 4; an unloading device 5 for unloading bottles 2 off drum 3; and a loading device 6 for loading bottles 2 onto drum 3.

Drum 3 comprises three tubular bodies 7, 8, 9, which are coaxial with axis 4, are made integral with one another by two annular end plates 10 (only one shown), and each comprise a number of superimposed rings 11 (only one shown) of respective radial holes 12, 13, 14. More specifically, each hole 12, formed through the outer tubular body 7, is coaxial, along a respective radial axis 15, with a respective hole 13 formed through the intermediate tubular body 8, and with a respective hole 14 formed through the inner tubular body 9; and each ring 11 of holes 12 is separated from the two adjacent rings 11 of holes 12 by two annular flanges 16 extending outwards from tubular body 7.

In a variation not shown, as opposed to being exactly radial, each axis 15 slopes slightly downwards towards axis 4.

Figure 2:
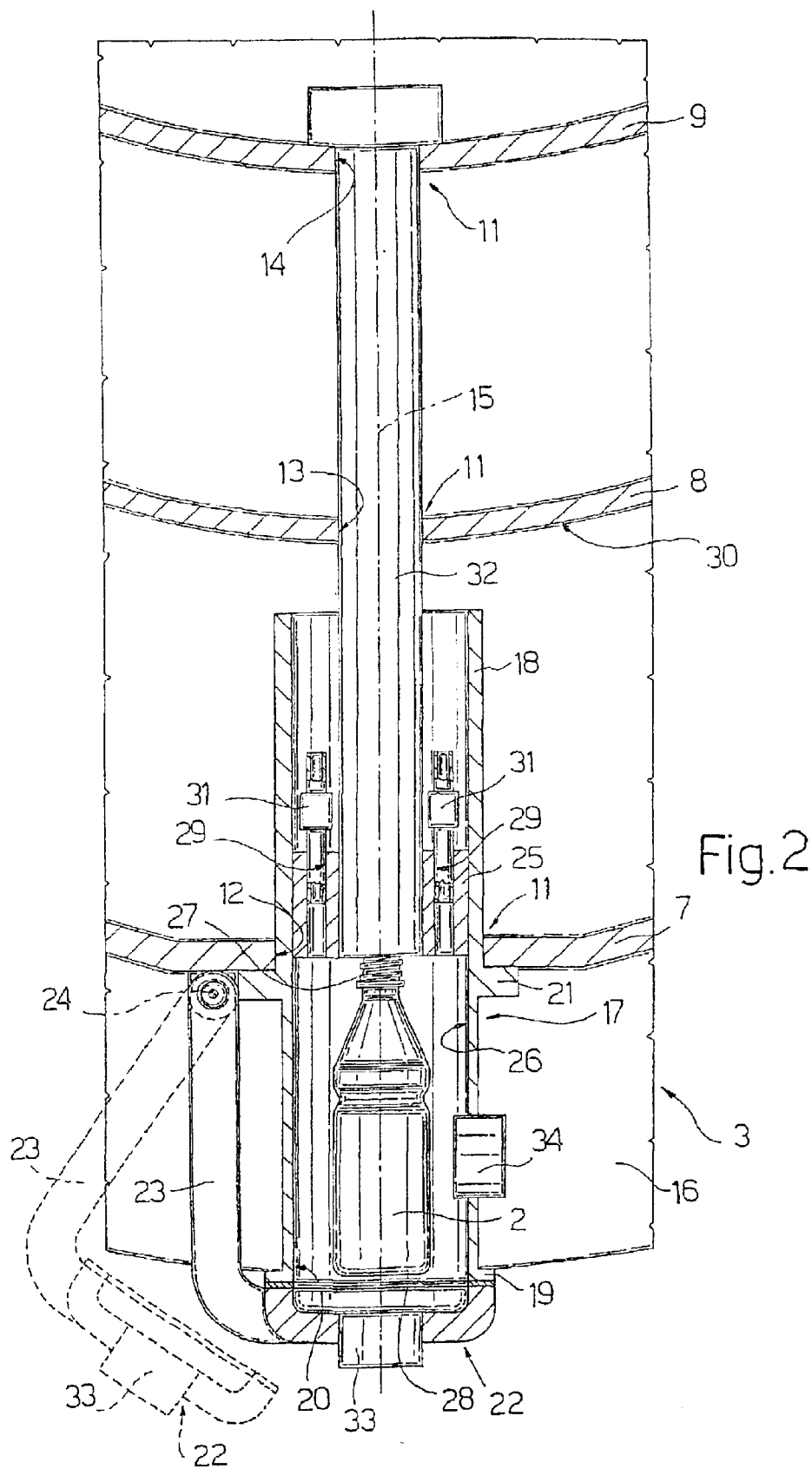
FIG. 2 shows a larger-scale plan view, with parts removed for clarity, of a detail of the FIG. 1 machine.

A radial work cell 17 is fitted through each hole 12, and, as shown more clearly in FIG. 2, is defined by a tubular conduit 18 coaxial with respective axis 15, extending in fluidtight manner through respective hole 12 up to a point close to tubular body 8, and having an annular end flange 19 surrounding an inlet opening 20 of cell 17, and an intermediate annular flange 21 for connection to tubular body 7. Each cell 17 also comprises a lid 22 laterally integral with an L-shaped bracket 23 hinged at one end to respective flange 21 to enable respective lid 22 to rotate, with respect to respective conduit 18 and about a respective axis 24 parallel to axis 4, between a closed work position contacting respective flange 19, and an open position opening respective inlet opening 20. Each cell 17 also comprises a bottom wall 25 located inside respective conduit 18 to define, with respective lid 22, a work chamber 26, the length of which, measured along respective axis 15, is sufficient to enable chamber 26 to receive a respective bottle 2, which, in the example shown, is housed inside chamber 26 with its neck 27 facing bottom wall 25 and with its base 28 substantially at opening 20, but which may be housed the other way around, depending on the treatment and/or processing operation to be performed in chamber 26.

Each bottom wall 25 comprises through holes 29 for connecting respective chamber 26 to a suction chamber 30 and having respective valves 31, which are controlled, together with respective lid 22 and by means of known cam systems not shown, to open or close depending on the position of respective lid 22 and the operation being performed inside respective chamber 26.

Chamber 30—which, in the example shown, is defined between tubular bodies 7 and 8, but which may be shaped and/or located differently—communicates simultaneously with all of cells 17, is of a volume much greater than the total volume of chambers 26, and, in use, is kept constantly under partial vacuum by means of a known suction device (not shown) to draw from cells 17 any debris and/or liquid or gaseous residue left in each chamber 26 following treatment and/or processing, e.g. mechanical or chemical, of bottles 2 by a number of operating heads 32, each of which is fitted, along a respective axis 15, through a respective pair of holes 13 and 14, and penetrates a respective chamber 26 through respective bottom wall 25.

In the example shown, each cell 17 has a further two, optional, operating units 33, 34 fitted through lid 22 and conduit 18 respectively, to perform respective operations which may be either independent or related to the operations performed by respective operating head 32.

The components required for performing and on-line checking correct performance of the treatment and/or processing operation in each cell 17 may be movable—partly or totally, depending on the treatment and/or processing operation—integrally with cells 17 and rings 11 housing the cells.

With reference to FIGS. 3 and 4, devices 5 and 6 for unloading and loading bottles 2 are structurally identical and therefore described using the same reference numbers.

Each device 5, 6 comprises a drum 35 rotating about an axis 36 parallel to axis 4, and having a number of gripping members 37 equally spaced about axis 36. Each gripping member 37 comprises a crank 38 hinged to drum 35 about an axis 39 parallel to axis 36; and a gripping head 40 integral with respective crank 38 and extending parallel to axis 36, so as to retain a number of bottles 2 arranged in a column in a direction parallel to axis 4, and load or withdraw a said column of bottles 2 into or from a corresponding number of cells 17 arranged in a column along the same generating line of drum 3. In the example shown, the bottles 2 in each column are retained by relative gripping head 40 exerting suction on bases 28 (but could, alternatively, be retained mechanically by necks 27).

Unloading device 5 is located between an unloading station 41 for unloading drum 3, and an unloading conveyor 42 for removing the columns of bottles 2 from unloading device 5. Similarly, loading device 6 is located between a loading station 43 for loading drum 3, and a loading conveyor 44 for supplying bottles 2 in columns, and defines, together with loading conveyor 44, drum 3, unloading device 5 and unloading conveyor 42, a portion of a production line 45.

In actual use, cells 17 are fed along an annular path P comprising a portion T1 subtended by an angle A, and a portion T2 subtended by an angle B. Bottles 2 undergo a given treatment and/or processing operation along portion T1, and are loaded and unloaded along portion T2. Along portion T1, cells 17 are closed by respective lids 22, and operating heads 32, and operating units 33 and 34 (if any), are activated; whereas, along portion T2, lids 22 are opened, and operating heads 32, and operating units 33 and 34 (if any), are deactivated. Along portions T1 and T2, valves 31 are controlled to connect or disconnect respective chambers 26 to or from suction chamber 30 via relative holes 29, depending, as stated, on the operations performed in cells 17. In other words, the state of each cell 17 changes as it passes cyclically from portion T2 to portion T1 and vice versa.

Bottles 2 are loaded and unloaded into and from respective cells 17 continuously by respective devices 6 and 5. Drum 35 of loading device 6 is rotated about respective axis 36 anticlockwise in FIG. 1, and each relative crank 38 is oriented about respective axis 39 to advance and reverse respective gripping head 40 at conveyor 44 and loading station 43. Each gripping head 40 is advanced and reversed by means of a known cam system (not shown) to position gripping head 40 a given length of time at loading conveyor 44, and long enough at a column of cells 17 to insert respective bottles 2 into cells 17 in the column.

Figure 5:
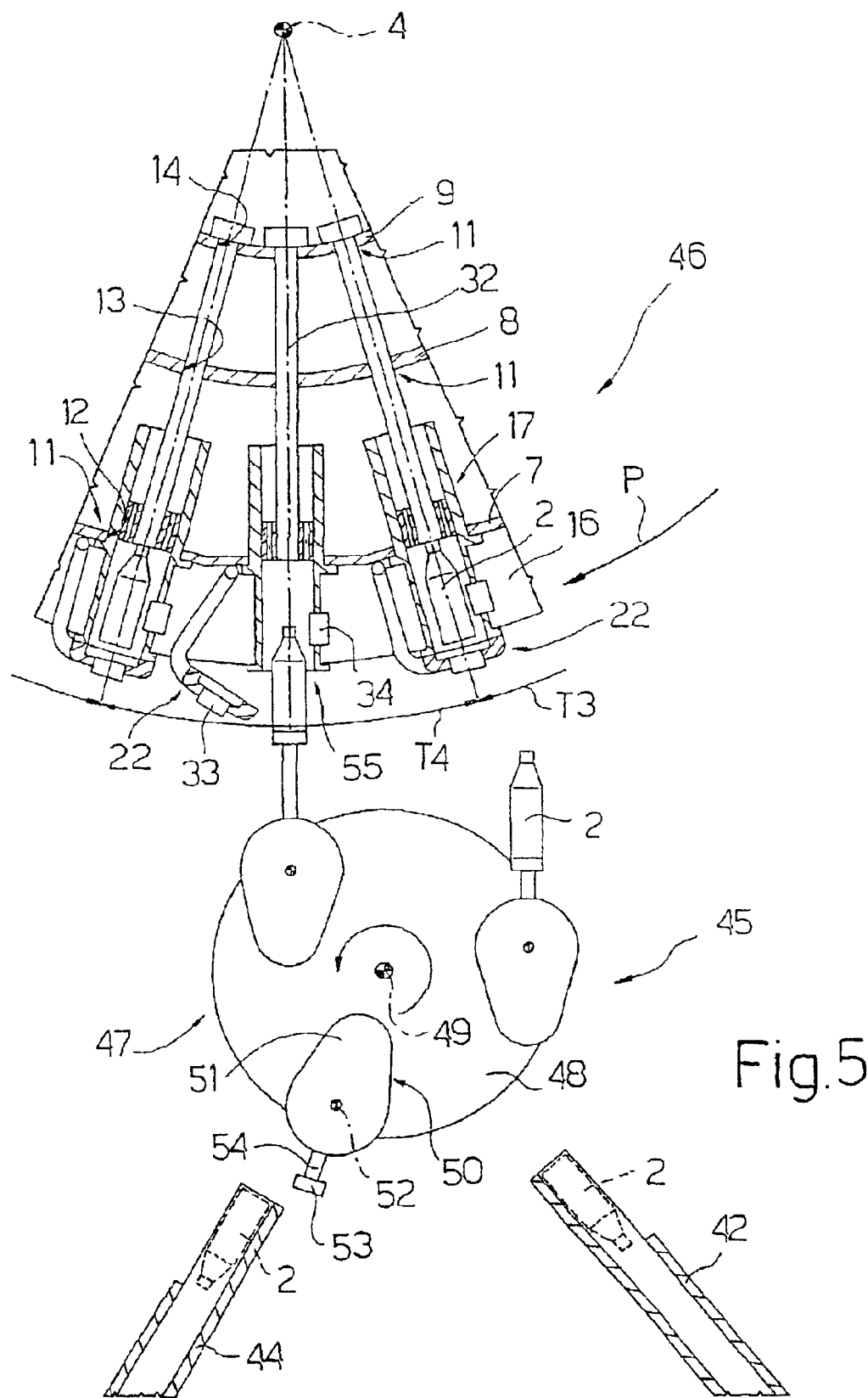
FIG. 5 shows a plan view, with parts removed for clarity, of a variation of the FIG. 1 machine.

The FIG. 5 variation relates to a machine 46 comprising a drum 3, a loading conveyor 44, an unloading conveyor 42, and a single transfer device 47 for loading and unloading bottles 2. Transfer device 47 comprises a drum 48 rotating about an axis 49 parallel to axis 4, and having gripping members 50 equally spaced about axis 49. Each gripping member 50 comprises a crank 51 rotating about an axis 52 parallel to axis 49; and a gripping head 53 connected to respective crank 51 by a telescopic arm 54.

Machine 46 is designed so that, in use, drum 3 and transfer device 47 are rotated to enable a treated and/or processed bottle 2 to be removed from a respective cell 17, and a bottle 2 for treatment and/or processing to be inserted into the same cell 17 by two gripping members 50 of transfer device 47 during a stop of drum 3. That is, along the periphery of drum 3, machine 46 comprises a station 55 which functions as both a loading and unloading station. In this case, path P is divided into a portion T3, along which bottles 2 undergo a given treatment and/or processing operation, and a portion T4, along which bottles 2 are loaded and unloaded. Portion T4 is shorter than portion T2, and portion T3 is longer than portion T1.

Figure 6:
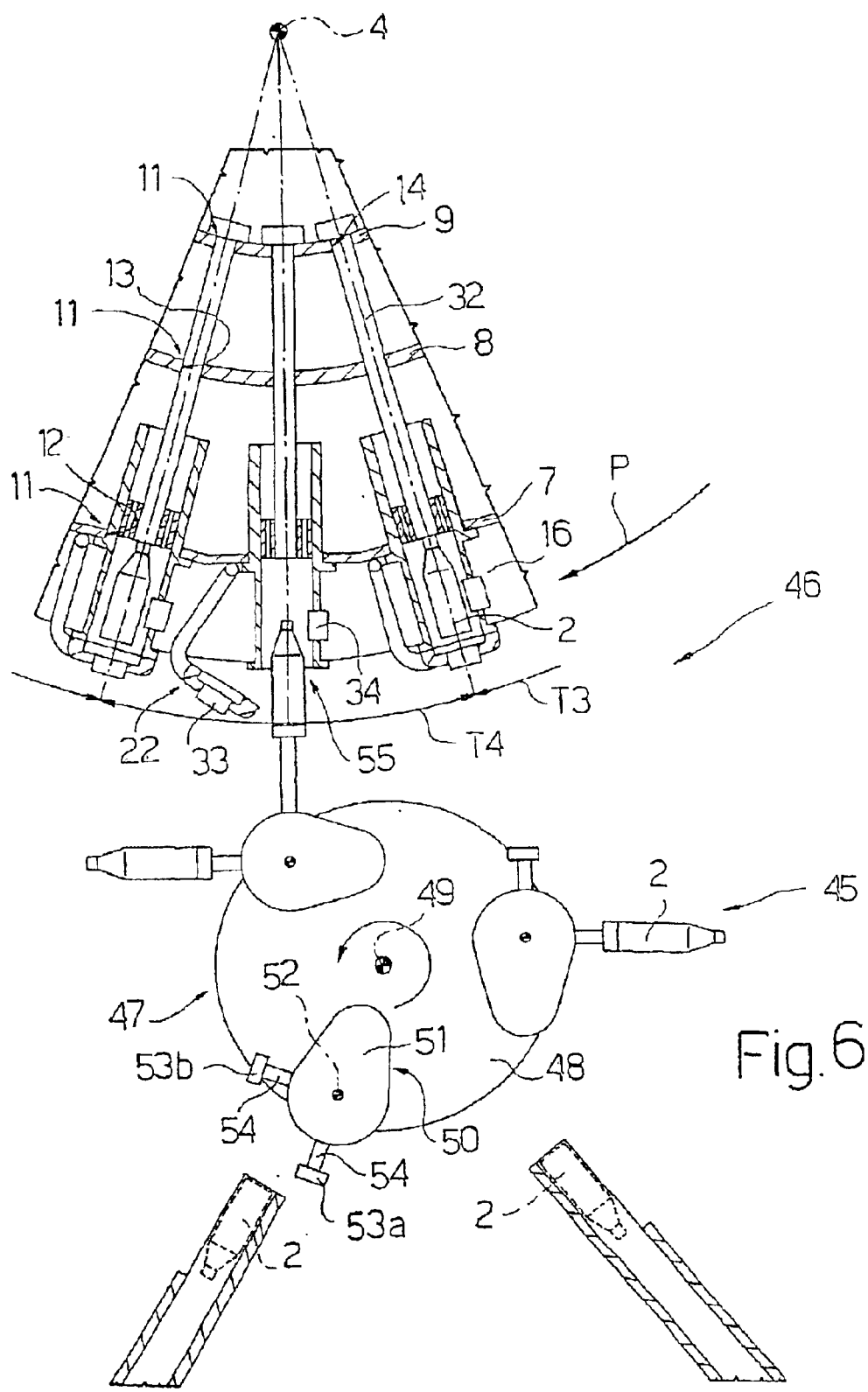
FIG. 6 shows a plan view, with parts removed for clarity, of a variation of a detail in FIG. 5.

In the FIG. 6 variation, each gripping member 50 of transfer device 47 comprises two gripping heads 53a, 53b connected to respective crank 51 by respective telescopic arms 54.

In actual use, each gripping member 50 provides for removing a column of bottles 2 from a respective column of cells 17, and for inserting another column of bottles 2 into the vacated column of cells 17. That is, each gripping head 53a removes bottles 2 along a first portion of portion T4, and the corresponding gripping head 53b inserts other bottles 2 into-the vacated cells 17 along a second portion of portion T4.

In the FIG. 6 variation, both drum 3 and drum 48 are preferably rotated continuously about respective axes 4 and 49. In this case, each crank 51 rotates about respective axis 52 to orient respective gripping heads 53a and 53b, and at the same time position respective gripping head 53b facing the cells 17 just vacated by respective gripping head 53a.

On both machines 1 and 46, drum 3 comprises about twenty-four cells 17 for each ring 11 of holes 12, and twelve superimposed rings 11 (only one shown) The number of cells 17, however, depends on the output rate for which the machine is designed, and drum 3 may even comprise one ring 11 of holes 12 and, hence, cells 17.

In a variation not shown, conduits 18 of each column are replaced by a single elongated box parallel to axis 4, having a single movable lid, and for housing a column of superimposed bottles 2.

As will be noted, drum 3 and drums 35 and 48, which may rotate continuously or in steps about respective axes 4, 36 and 49, only increase the length of production line 45, with no reduction in the traveling speed of bottles 2 along line 45, and hence no reduction in the output rate of line 45, on account of the treatment and/or processing operation to which bottles 2 are subjected being completed in the time bottles 2 remain inside respective cells 17, and therefore involving no downtime.

What is claimed is:

1. A method of on-line treating and/or processing containers, the method comprising the steps of feeding at least one container (2) along a production line (45) comprising a conveying drum (3) rotating about a vertical axis (4) to define an annular path (P) extending through a loading station (43) and an unloading station (41) for containers (2); loading the container (2), at said loading station (43) and in a substantially radial direction with respect to said conveying drum (3), into a respective processing cell (17) positioned substantially radially with respect to said axis (4) and movable with said conveying drum (3) along said path (P); subjecting the container (2) to a treatment and/or processing operation inside said cell (17) and as the cell (17) is fed from said loading station (43; 55) to said unloading station (41; 55); and unloading the container (2) radially from the cell (17) at the unloading station (41; 55); the method being characterized in that the conveying drum (3) comprises a first number of rings (11) of cells (17) superimposed along said axis (4), and each ring (11) comprises a same number of cells (17) equally spaced about said axis (4); said loading step comprising loading a first number of containers (2) simultaneously into respective said cells (17) arranged in a column along said conveying drum (3); and said unloading step comprising unloading a first number of containers (2) simultaneously radially from the respective cells (17) arranged in a column along said conveying drum (3).

2. A method as claimed in claim 1, wherein said path (P) comprises a first portion (T1; T3) along which said treatment and/or said processing operation are/is performed; and a second portion (T2; T4) along which said container (2) is loaded into said cell (17), and said container (2) is unloaded from said cell (17); the method comprising the steps of closing said cell (17) by means of a respective lid (22) along said first portion (T1; T3); and opening said cell (17) by moving said lid (22) along said second portion (T2; T4).

3. A machine for on-line treating and/or processing containers, the machine comprising a production line (45) for producing containers (2) and in turn comprising a conveying drum (3) having a number of substantially radial cells (17) and rotating about a vertical axis (4) to feed each cell (17) along an annular path (P), along which are located a loading station (43; 55) and an unloading station (41; 55) for containers (2); operating means (32, 33, 34) associated with the cells (17) to effect, in each cell (17), a treatment and/or processing operation as the cell (17) is fed from said loading station (43; 55) to said unloading station (41; 55); and transfer means (5, 6; 47) for loading the containers (2) radially into the cells (17) at said loading station (43; 55), and extracting the containers (2) radially from the cells (17) at said unloading station (41; 55); the machine being characterized in that the conveying drum (3) comprises a first number of rings (11) of cells (17) superimposed along said axis (4), and each ring (11) comprises a same number of cells (17) equally spaced about said axis (4); said transfer means (5, 6; 47) being able to load at said loading station (43; 55) a first number of containers (2) simultaneously into respective said cells (17) arranged in a column along said conveying drum (3); and said transfer means (5, 6; 47) being able to unload at said unloading station (41; 55) a first number of containers (2) simultaneously radially from the respective cells (17) arranged in a column along said conveying drum (3).

4. A machine as claimed in claim 1, wherein each said cell (17) comprises a movable lid (22) for closing the cell (17); each lid (22) being fitted to said conveying drum (3) to rotate with respect to the conveying drum (3) and between an open position and a closed position respectively opening and closing said cell (17).

5. A machine as claimed in claim 3, wherein the components required for performing and on-line checking correct performance of the treatment and/or processing operation in each said cell (17) may be movable—partly or totally, depending on the treatment and/or processing operation—integrally with the cells (17) and said rings (11).

6. A machine as claimed in claim 3, wherein said transfer means (5, 6) extend along the axis (4) of rotation of said conveying drum (3) to simultaneously load and, respectively, simultaneously unload a number of said containers (2) into and from respective said cells (17) arranged in a column along said conveying drum (3).

7. A machine as claimed in claim 6, wherein said transfer means (5, 6) comprise a loading device (6) and an unloading device (5) for respectively loading and unloading the containers (2); said loading station (43) and said unloading station (41) being separate and apart from each other; said loading device (6) and said unloading device (5) extend along the axis (4) of rotation of said conveying drum (3) to simultaneously load and, respectively, simultaneously unload a number of said containers (2) into and from respective said cells (17) arranged in a column along-said conveying drum (3).

8. A machine as claimed in claim 6, wherein said transfer means (47) comprise a single loading and unloading device (47) for loading and unloading the containers (2); said loading station and said unloading station coinciding to define a loading-unloading station (55).

9. A machine as claimed in claim 3, wherein each said cell (17) is defined by a relevant radial conduit (18), which has a first end closed by a bottom wall (25) and a second end opposite to the first end closed by a movable lid (22) to define a work chamber (26) able to house a relevant container (2).

10. A machine as claimed in claim 9, wherein each said lid (22) is moved by cam means from an open position to a closed position and vice versa.

11. A machine as claimed in claim 9, wherein said radial conduit (18) has a tubular shape.

12. A machine as claimed in claim 9, wherein each said bottom wall (25) comprises through holes (29) for connecting respective chamber (26) to a suction means (30) by means of respective valves (31).

13. A machine as claimed in claim 12, wherein said valves (31) are controlled by cam means.

14. A machine as claimed in claim 12, wherein said suction means (30) comprises a suction chamber (30), which communicates simultaneously with all of said cells (17), is of a volume much greater than the total volume of said chambers (26), and, in use, is kept constantly under partial vacuum by means of a suction device.

15. A machine as claimed in claim 9, wherein each said cell (17) comprises further relevant operating unit (33), which are fitted through the relevant lid (22) and are able to subject the respective container (2) to a treatment and/or processing operation inside the cell (17).

* * * * *